US010208989B2

United States Patent
Cho et al.

(10) Patent No.: US 10,208,989 B2
(45) Date of Patent: Feb. 19, 2019

(54) ABSORPTION REFRIGERATION MACHINE

(71) Applicant: LG ELECTRONICS INC., Seoul (KR)

(72) Inventors: Hyunuk Cho, Seoul (KR); Jinhee Jeong, Seoul (KR); Sangchul Nam, Seoul (KR); Wansoo Lee, Seoul (KR); Heungju Lee, Seoul (KR); Yongsun Cho, Seoul (KR)

(73) Assignee: LG ELECTRONICS INC., Seoul (KR)

(*) Notice: Subject to any disclaimer, the term of this patent is extended or adjusted under 35 U.S.C. 154(b) by 228 days.

(21) Appl. No.: 15/256,894

(22) Filed: Sep. 6, 2016

(65) Prior Publication Data

US 2017/0205123 A1   Jul. 20, 2017

(30) Foreign Application Priority Data

Jan. 14, 2016   (KR) .................. 10-2016-0004844

(51) Int. Cl.
*F25B 15/00*   (2006.01)
*F25B 15/06*   (2006.01)

(52) U.S. Cl.
CPC ............ *F25B 15/06* (2013.01); *F25B 15/008* (2013.01); *Y02A 30/277* (2018.01); *Y02B 30/62* (2013.01)

(58) Field of Classification Search
CPC ....... Y02A 30/277; Y02B 30/62; F25B 15/06; F25B 15/008
See application file for complete search history.

(56) References Cited

FOREIGN PATENT DOCUMENTS

| KR | 10-1997-0028253 | 6/1997 |
|---|---|---|
| KR | 10-0746241 | 8/2007 |
| KR | 10-0895885 | 5/2009 |
| KR | 100895885 B1 * | 5/2009 |
| KR | 10-1042812 | 6/2011 |
| KR | 10-1271602 | 6/2013 |
| KR | 10-1347582 | 1/2014 |

OTHER PUBLICATIONS

Korean Notice of Allowance dated Jun. 12, 2017 issued in Application No. 10-2016-0004844.
Korean Office Action dated Nov. 18, 2016 issued in Application No. 10-2016-0004844.

* cited by examiner

*Primary Examiner* — Ana M Vazquez
(74) *Attorney, Agent, or Firm* — KED & Associates, LLP

(57) ABSTRACT

An absorption refrigeration machine may include a first regenerator for primarily regenerating an absorbing liquid absorbing a refrigerant; a second regenerator for secondarily regenerating the absorbing liquid primarily regenerated from the first regenerator; an auxiliary absorber provided with the second regenerator, to allow an auxiliary absorbing liquid to absorb the refrigerant; and an auxiliary regenerator for regenerating the auxiliary absorbing liquid carrying the refrigerant in the auxiliary absorber.

17 Claims, 6 Drawing Sheets

ABSORPTION REFRIGERATION MACHINE

CROSS-REFERENCE TO RELATED APPLICATIONS

The present application claims priority under 35 U.S.C. § 119 to Korean Patent Application No. 10-2016-0004844, filed on Jan. 14, 2016, whose entire disclosure is hereby incorporated by reference.

BACKGROUND

1. Field

The present disclosure relates to an absorption refrigeration machine.

2. Background

An absorption refrigeration machine (or refrigerator) is an apparatus that includes an evaporator, an absorber, a condenser, and a regenerator to perform cooling or heating. In contrast to a turbo (or compressor-based) refrigeration machine that mechanically compresses a refrigerant using a compressor and performs cooling or heating using the compressed refrigerant, the absorption refrigeration machine performs cooling or heating by having the refrigerant absorbed into an absorbing liquid in the absorber, evaporating the refrigerant as the absorbing liquid carrying the refrigerant passes through the evaporator, and the condensing the evaporated refrigerant in the condenser.

In the absorption refrigeration machine, the evaporator cools an absorbing liquid such as water (or other fluid) and/or the condenser heats the water. In the absorption refrigeration machine, the absorbing liquid absorbs the refrigerant, thereby enabling a heat pump to be operated.

A conventional absorption refrigeration machine is described in Korean Patent Laid-Open Publication No. 1996-0058710. This reference is incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1:
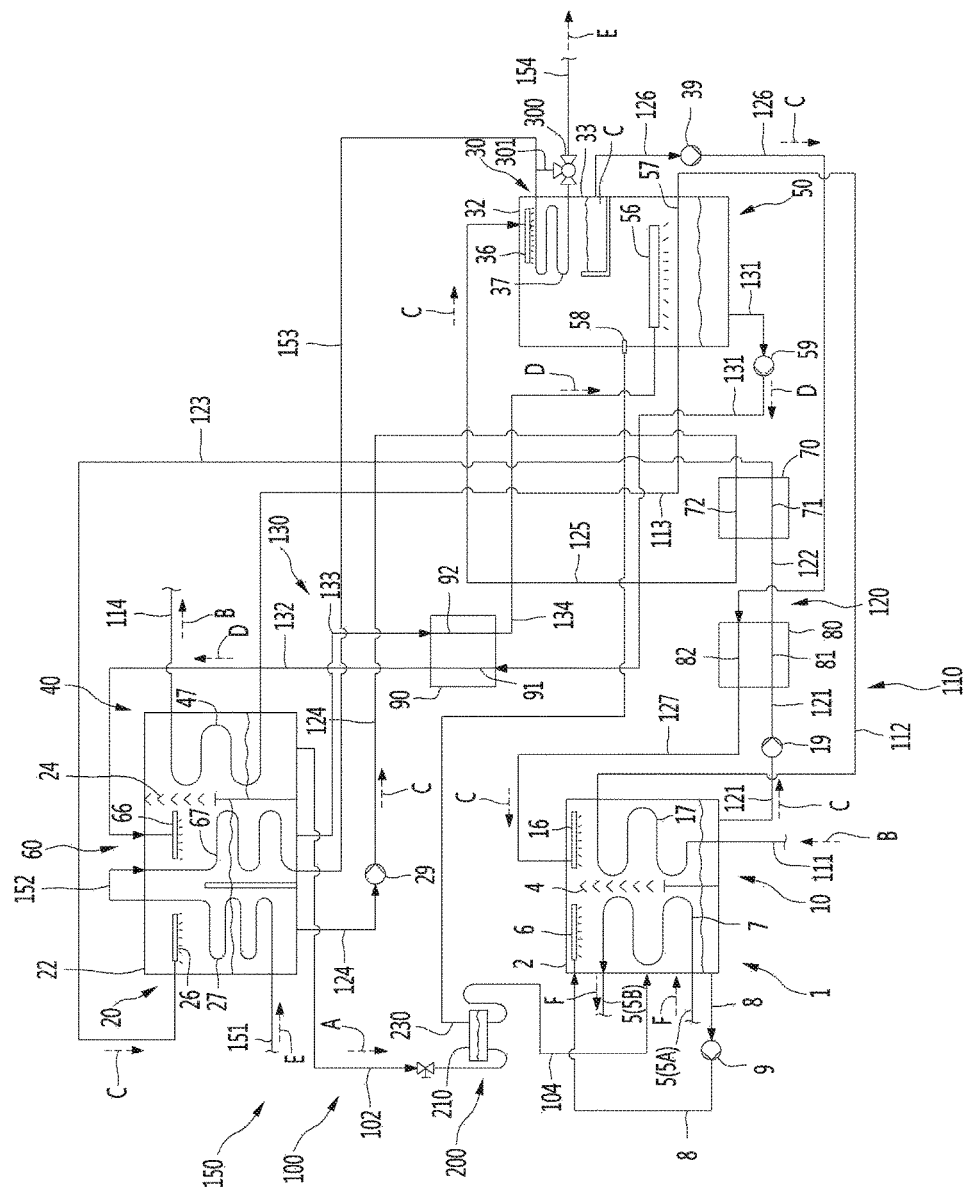
FIG. 1 is a view illustrating a configuration of an absorption refrigeration machine according to an embodiment.

FIG. 1 illustrates an absorption refrigeration machine according to one embodiment. The absorption refrigeration machine according to this embodiment may be a two-stage absorption refrigeration machine. As depicted in FIG. 1, the absorption refrigeration machine may include, for example, an evaporator 1, an absorber 10, a first regenerator 20, a second regenerator 30, a condenser 40, an auxiliary (or third) absorber 50, an auxiliary (or second) regenerator 60, a high-temperature heat exchanger 70, a low-temperature heat exchanger 80, and an auxiliary heat exchanger 90.

In the absorption refrigeration machine depicted in FIG. 1, the evaporator 1 and the absorber 10 are provided in a first shell (or section) 2 such that a refrigerant evaporated in the evaporator 1 can be moved to the absorber 10. The inside of the first shell 2 may have an evaporation area in which a liquid refrigerant A is warmed and evaporated through a heat-exchange with cold water F, and an absorption area in which the gaseous refrigerant flowing from the evaporation area is absorbed into an absorbing liquid C (also referred to as a first absorbing liquid). A first eliminator 4 may be disposed inside the first shell 2. In this location, the first eliminator 4 partitions the evaporation area and the absorption area, and allows the gaseous refrigerant in the evaporation area to flow into the absorption area.

The evaporator 1 may include a refrigerant injector 6 that injects a refrigerant into the evaporation area, and a cold water tube 7 that passes through the evaporation area and transports a cold (e.g., unheated) water or other fluid (F) for a heat-exchange with the refrigerant injected from the refrigerant injector 6.

The absorption refrigeration machine may further include a cold water line (or "tube") 5 through which the cold water is supplied to the evaporator 1. The cold water line 5 may be connected to the evaporator 1, and more particularly, the cold water tube 7. The cold water line 5 may include a cold water inlet line 5A connected to the cold water tube 7 of the evaporator 1 to allow the cold water (e.g., a temperature of 13° C.) to be introduced into the cold water tube 7 of the evaporator 1, and a cold water outlet line 5B connected to the cold water tube 7 of the evaporator 1 to allow even colder water (e.g., at a temperature of 8° C.) that is cooled within the evaporator 1 to be discharged from the cold water tube 7 of the evaporator 1.

The cold water in the cold water tube 7 of the evaporator 1 may be cooled through a heat-exchange with the refrigerant of the evaporator 1. For example, the refrigerant injector 6 may position the liquid refrigerant onto the cold water tube 7, and the cold water F may be cooled as the heat of the cold water is absorbed the refrigerant of the evaporator 1 when the refrigerant evaporates. The cold water cooled by the evaporator 1, as described above, may flow into the cold water outlet line 5B. The cold water F flowing into the cold water outlet line 5B may be supplied to a cold water demand source (e.g., a building, motor, etc.) to cool the cold water demand source.

The evaporator 1 may further include a pumping flow path 8 that guides the liquid refrigerant to the refrigerant injector 6 positioned at a top portion of the evaporator 1 such that the liquid refrigerant released by the refrigerant injector 6 is moved by gravity to a lower portion of the evaporation area, and a refrigerant pump 9 installed in the pumping flow path 8 moves the liquid refrigerant within the pumping flow path 8. The refrigerant injected from the refrigerant injector 6 to the evaporation area is heat-exchanged with the cold water tube 7 to be changed into a gaseous refrigerant while taking heat from the cold water tube 7. The gaseous refrigerant may flow into the absorption area by passing through the first eliminator 4.

The absorber (also referred to as a "first absorber") 10 allows the gaseous refrigerant evaporated in the evaporator 1 to be absorbed into an absorbing liquid C (also referred to as a "first absorbing liquid"). The absorber 10 includes an absorbing liquid injector 16 that injects the absorbing liquid C into the absorption area, and a cooling water tube 17 that is located in the absorbing area and allows cooling water (also referred to as a cooling fluid) to pass through the absorbing area.

The gaseous refrigerant A flowing from the evaporation area into the absorption area may be absorbed in the absorbing liquid C injected from the absorbing injector 16, and heat generated when the gaseous refrigerant is absorbed into the absorbing liquid may be transferred via a heat exchange to the cooling water passing through the cooling water tube 17 of the absorber 10. Meanwhile, as described below, the absorbing liquid C injected from the absorbing liquid injector 16 may be changed into a dilute solution (e.g., a solution carrying the dissolved refrigerant), and then the dilute solution may flow into the first regenerator 20 to be primarily separated from the refrigerant in the first regenerator 20.

In the absorption refrigeration machine depicted in FIG. 1, the first regenerator 20, the auxiliary regenerator 60, and the condenser 40 may be provided in a second shell (or portion) 22 such that the refrigerant separated from the absorbing liquid in the first regenerator 20 and a refrigerant separated from an auxiliary absorbing liquid D (also referred to as a second absorbing liquid) in the auxiliary regenerator 60 are collected to flow into the condenser 40. Inside the second shell 22, the first regenerator 20 is disposed in a first regeneration area in which the dilute solution carrying the absorbed refrigerant from the absorber 10 is heat-exchanged with hot water E (also referred to as a warming fluid) to be primarily changed into a concentrated solution while evaporating the refrigerant. The auxiliary regenerator 60 is disposed in an auxiliary regeneration area in which a dilute solution carrying the absorbed refrigerant is warned through a heat-exchange with hot water to be changed into a concentrated solution while evaporating the refrigerant. The condenser 40 is disposed in a condensation area in which the gaseous refrigerant flowing from the first regeneration area and the auxiliary regeneration area are condensed by cooling water.

In addition, a second eliminator 24 may be disposed inside the second cell 22. Here, the second eliminator 24 partitions the condensation area from the first regeneration area and the auxiliary regeneration area, and allows the gaseous refrigerant to flow into the condensation area therethrough. As depicted in FIG. 1, the first regenerator 20 may include an absorbing liquid injector 26 that injects, into the first regeneration area, the absorbing liquid C in a dilute solution state, which absorbed the refrigerant in the absorber 10, and a hot water tube 27 through which hot water passes. The condenser 40 may include a cooling water tube 47 in which the gaseous refrigerant flowing from the first regenerator 20 and the gaseous refrigerant flowing from the auxiliary regenerator 30 are heat-exchanged with each other.

In the absorption refrigeration machine shown in FIG. 1, the second regenerator 30 and the auxiliary absorber 50 may be provided in a third shell 32 such that a refrigerant evaporated in the second regenerator 30 may flow to the auxiliary absorber 50. The second regenerator 30 and the auxiliary absorber 50 may be provided inside the third shell 32. In the third shell 32, the second regenerator 30 is disposed in a second regeneration area in which the absorbing liquid primarily separated from the refrigerant in the first regenerator 20 is heat-exchanged with hot water to be secondarily changed into a concentrated solution while evaporating the refrigerant. The auxiliary absorber 50 is disposed in an auxiliary absorption area in which an auxiliary absorbing liquid D separated from a refrigerant in the auxiliary regenerator 60 absorbs the gaseous refrigerant evaporated in the second regeneration area.

Specifically, the second regenerator 30 may be disposed at an inner upper portion of the third shell 32, and the auxiliary absorber 50 may be disposed at an inner lower portion of the third shell 32. Accordingly, the gaseous refrigerant evaporated in the second generator 30 can be absorbed into the auxiliary absorbing liquid D of the auxiliary absorber 50. An absorbing liquid acceptor (or tray) 33 in which an absorbing liquid C changed into a concentrated liquid in the second regeneration area is contained may be installed inside the third shell 32. The second regenerator 30 may include a second absorbing liquid injector 36 that injects the absorbing liquid C primarily separated from the refrigerant in the first regenerator 20, and a hot water tube 37 inside which hot water flows, and the hot water is heat-exchanged with the absorbing liquid injected from the second absorbing liquid injector 36.

The auxiliary absorber 50 may include an auxiliary absorbing liquid injector 56 that injects an auxiliary absorbing liquid D into the auxiliary absorption area, and a cooling water tube 57 through which cooling water passes. The gaseous refrigerant evaporated in the second regenerator 50 and then flowing into the auxiliary absorption area may be absorbed into the auxiliary absorbing liquid D injected from the auxiliary absorbing liquid injector 56. The auxiliary absorbing liquid D injected from the auxiliary absorbing liquid injector 56 may be diluted by absorbing the gaseous refrigerant. Heat generated when the gaseous refrigerant D is absorbed into the auxiliary absorbing liquid D may be transferred to the cooling water passing through the cooling water tube 57 of the auxiliary absorber 50.

As depicted in FIG. 1, the auxiliary absorber 50 may further include a gaseous refrigerant introduction part 58 into which a gaseous refrigerant flowing from a flash tank 200, which will be described below, is introduced. The gaseous refrigerant introduction part 58 may be formed in the third shell 32. Particularly, the gaseous refrigerant inlet part 58 may be formed at a position of the auxiliary absorption area in the third shell 32.

The auxiliary absorption liquid D, diluted by absorbing the gaseous refrigerant in the auxiliary absorber 50, may flow into the auxiliary regenerator 60. The auxiliary regenerator 60 may include an auxiliary absorbing liquid injector 66 that injects the auxiliary absorbing liquid D diluted by absorbing the gaseous liquid in the auxiliary absorber 50 into the auxiliary regenerator 60, and a hot water tube 67 through which hot water passes.

The high-temperature heat exchanger 70 may include a third flow path 71 through which a dilute solution flowing through a first flow path 81 of the low-temperature heat exchanger 80, which will be described later, passes, and a fourth flow path 72 through which a concentrated solution flowing from the first regenerator 20 passes. The dilute solution passing through the third flow path 71 and the concentrated solution passing through the fourth flow path 72 may be heat-exchanged with each other in the high-temperature heat exchanger 70.

The low-temperature heat exchanger 80 may include the first flow path 81 through which a dilute solution flowing from the absorber 10 passes, and a second flow path 82 through which a concentrated solution flowing from the second regenerator 30 passes. The dilute solution passing through the first flow path 81 and the concentrated solution passing through the second flow path 82 may be heat-exchanged with each other in the low-temperature heat exchanger 80.

The auxiliary heat exchanger 90 may include a fifth flow path 91 through which a dilute solution flowing from the auxiliary absorber 50 passes, and a sixth flow path 92 through which a concentrated solution flowing from the auxiliary regenerator 60 passes. The dilute solution passing through the fifth flow path 91 and the concentrated solution passing through the sixth flow path 92 may be heat-exchanged with each other in the auxiliary heat exchanger 90.

The absorption refrigeration machine shown in FIG. 1 may further include a refrigerant line 100, a cooling water line 110, a first absorbing liquid line 120, a second absorbing liquid line 130, a hot water line 150, and a bypass flow path 301. The refrigerant line 100 may guide a refrigerant A such that the refrigerant A sequentially passes through the condenser 40 and the evaporator 1. The flash tank 200 may be installed in the refrigerant line 100 and/or may constitute a portion of the refrigerant line 100.

For example, the refrigerant line 100 may include a flash tank entry line 102 between the condenser 40 and the flash tank 200, and a flash tank exit line 104 between the flash tank 200 and the evaporator 1. One end of the flash tank entry line 102 may be connected to the condenser 40 and/or to the second shell 22 that houses the condenser 40, and the other end of the flash tank entry line 102 may be connected to the flash tank 200. One end of the flash tank exit line 104 may be connected to the flash tank 200, and the other end of the flash tank exit line 104 may be connected to the evaporator 1, the first shell 2 housing the evaporator 1, and/or the pumping flow path 8.

The cooling water line 110 may be connected such that cooling water B sequentially passes through the absorber 10, the auxiliary absorber 50, and the condenser 40. The cooling water line 110 may include a cooling water entry line 111 connected to the cooling water tube 17 of the absorber 10 to guide cooling water into the cooling water tube 17 of the absorber 10. The cooling water line 110 may further include an absorber-auxiliary absorber connection line 112 connected to the cooling water tube 17 of the absorber 10 and the cooling water tube 57 of the auxiliary absorber 50 to allow cooling water passing through the cooling water tube 17 of the absorber 10 to be guided into the cooling water tube 57 of the auxiliary absorber 50 therethrough.

The cooling water line 110 may further include an auxiliary absorber-condenser connection line 113 connected to the cooling water tube 57 of the auxiliary absorber 50 and the cooling water tube 47 of the condenser 40 to allow cooling water passing through the cooling water tube 57 of the auxiliary absorber 50 to be guided into the cooling water tube 47 of the condenser 40 therethrough. The cooling water line 110 may further include a cooling water outlet line 114 connected to the cooling water tube 47 of the condenser 40 to allow cooling water passing through the cooling water tube 47 of the condenser 40 to be discharged to the outside.

The first absorbing liquid line 120 may be connected such that an absorbing liquid C circulates in an order of the absorber 10, the low-temperature heat exchanger 80, the high-temperature heat exchanger 70, the first regenerator 20, the high-temperature heat exchanger 70, the second regenerator 50, the low-temperature heat exchanger 80, and the absorber 10.

The first absorbing liquid line 120 may include an absorber-low-temperature heat exchanger connection line 121 connected to the absorber 10 and the first flow path 81 of the low-temperature heat exchanger 80 to allow an absorbing liquid absorbing a refrigerant in the absorber 10 to be guided into the first flow path 81 of the low-temperature heat exchanger 80 therethrough. A first pump 19 may be installed in the absorber-low-temperature heat exchanger connection line 121. The first absorbing liquid line 120 may further include a low-temperature heat exchanger-high-temperature heat exchanger connection line 122 connected to the first flow path 81 of the low-temperature heat exchanger 80 and the third flow path 71 of the high-temperature heat exchanger 70 to allow an absorbing liquid passing through the first flow path 81 of the low-temperature heat exchanger 80 to be guided into the third flow path 71 of the high-temperature heat exchanger 70 therethrough.

The first absorbing liquid line 120 may further include a high-temperature heat exchanger-first regenerator connection line 123 connected to the third flow path 71 of the high-temperature heat exchanger 70 and the absorbing liquid injector 26 of the first regenerator 20 to allow an absorbing liquid passing through the third flow path 71 of the high-temperature heat exchanger 70 to be guided into the absorbing liquid injector 26 of the first regenerator 20 therethrough. The first absorbing liquid line 120 may further include a first regenerator-high-temperature heat exchanger connection line 124 connected to the first regenerator 20 and the fourth flow path 72 of the high-temperature heat exchanger 70 to allow an absorbing liquid primarily separated from a refrigerant in the first regenerator 20 to be guided into the fourth flow path 72 of the high-temperature heat exchanger 70. A second pump 29 may be installed in the first regenerator-high-temperature heat exchanger connection line 124.

The first absorbing liquid line 120 may further include a high-temperature heat exchanger-second regenerator connection line 125 connected to the fourth flow path 72 of the high-temperature heat exchanger 70 and the absorbing liquid injector 36 of the second regenerator 30 to allow an absorbing liquid passing through the fourth flow path 72 of the high-temperature heat exchanger 70 to be guided into the absorbing liquid injector 36 of the second regenerator 30 therethrough. The first absorbing liquid line 120 may further include a second regenerator-low-temperature heat exchanger connection line 126 connected to the absorbing liquid acceptor 33 of the second regenerator 30 and the second flow path 82 of the low-temperature heat exchanger 80 to allow an absorbing liquid contained in the absorbing liquid acceptor 33 to be guided into the second flow path 82 of the low-temperature heat exchanger 80 therethrough.

The first absorbing liquid line 120 may further include a low-temperature heat exchanger-absorber connection line 127 connected to the second flow path 82 of the low-temperature heat exchanger 80 and the absorbing liquid injector 16 of the absorber 10 to allow an absorbing liquid passing through the second flow path 82 of the low-temperature heat exchanger 80 to be guided into the absorbing liquid injector 16 of the absorber 10 therethrough.

The second absorbing liquid line 130 may be connected such that an auxiliary absorbing liquid D circulates in an order of the auxiliary absorber 50, the auxiliary heat exchanger 90, the auxiliary regenerator 40, the auxiliary heat exchanger 90, and the auxiliary absorber 10. The second absorbing liquid line 130 may include an auxiliary absorber-auxiliary heat exchanger connection line 131 connected to the auxiliary absorber 50 and the fifth flow path 91 of the auxiliary heat exchanger 90 to allow an auxiliary absorbing liquid absorbing a gaseous refrigerant in the auxiliary absorber 50 to be guided into the fifth flow path 51 of the auxiliary heat exchanger 90 therethrough.

The second absorbing liquid line 130 may further include an auxiliary heat exchanger-auxiliary regenerator connection line 132 connected to the fifth flow path 91 of the auxiliary heat exchanger 90 and the auxiliary absorbing liquid injector 66 of the auxiliary regenerator 60 to allow an auxiliary absorbing liquid passing through the fifth flow path 91 of the auxiliary heat exchanger 90 to be guided into the auxiliary absorbing liquid injector 66 of the auxiliary regenerator 60 therethrough.

The second absorbing liquid line 130 may further include an auxiliary regenerator-auxiliary heat exchanger connection line 133 connected to the auxiliary regenerator 60 and the sixth flow path 92 of the auxiliary heat exchanger 90 to allow an auxiliary absorbing liquid obtained by evaporating a gaseous refrigerant in the auxiliary regenerator 60 to be guided into the sixth flow path 92 of the auxiliary heat exchanger 90 therethrough. The second absorbing liquid line 130 may further include an auxiliary heat exchanger-auxiliary absorber connection line 134 connected to the sixth flow path 92 of the auxiliary heat exchanger 90 and the auxiliary absorbing liquid injector 56 of the auxiliary absorber 50 to allow an auxiliary absorbing liquid passing through the sixth flow path 92 of the auxiliary heat exchanger 90 to be guide into the auxiliary absorbing liquid injector 56 of the auxiliary absorber 50 therethrough.

The hot water line 150 may be connected such that hot water E sequentially passes through the first regenerator 20, the auxiliary regenerator 40, and the second regenerator 50. The hot water line 150 may include a hot water inlet line 151 connected to the hot water tube 27 of the first regenerator 20 to allow hot water E to be guided into the hot water tube 27 of the first regenerator 20 therethrough. The hot water E flowing into the hot water inlet line 151 may be hot water supplied from a hot water supply source (e.g. a district heating corporation, a building environmental control system, a water heater, etc.).

The hot water line 150 may further include a first regenerator-auxiliary regenerator connection line 152 connected to the hot water tube 27 of the first regenerator 20 and the hot water tube 67 of the auxiliary regenerator 60 to allow hot water passing through the hot water tube 27 of the first regenerator to be guided into the hot water tube 67 of the auxiliary regenerator 60 therethrough. The hot water line 150 may further include an auxiliary regenerator-second regenerator connection line 153 connected to the hot water tube 67 of the auxiliary regenerator 60 and the hot water tube 37 of the second regenerator 30 to allow hot water E passing through the hot water tube 67 of the auxiliary regenerator 60 to be selectively guided into the hot water tube 37 of the second regenerator 30 therethrough.

The hot water line 150 may further include a hot water outlet line 154 connected to the hot water tube 37 of the second regenerator 30 to allow hot water passing through the hot water tube 37 of the second regenerator 30 to be discharged to the outside therethrough. Also, the hot water line 150 may include or may otherwise be coupled to the bypass flow path 301, thereby selectively changing the introduction of hot water into the second regenerator 30.

Specifically, the bypass flow path 301 may be disposed to directly connect the auxiliary regenerator-second regenerator connection line 153 and the hot water outlet line 154 to each other, thereby allowing hot water to directly flow from the auxiliary regenerator-second regenerator connection line 153 to the hot water outlet line 154. In this case, the hot water may selectively flow from the auxiliary regenerator-second regenerator connection line 153 to the hot water outlet line 154.

In addition, a bypass valve 300 may be disposed in the bypass flow path 301. The bypass valve 300 is a valve capable of controlling the flow of hot water E such that the hot water E can selectively flow through the bypass flow path 301. For example, the bypass valve 300 may be a three-way valve having three input/output parts. For instance, the three input/output parts formed in the bypass valve 300 may include a first input/output part (or port) 300*a* that allows hot water passing through the hot water tube 37 of the second regenerator 30 to be introduced into the bypass valve 300 therethrough when the auxiliary absorbing liquid flow into the auxiliary absorber-auxiliary heat exchanger connection line 131, a second input/output part (or port) 300*c* that allows hot water passing through the first input/output part 300*a* to be guided into the hot water outlet line 154 therethrough, and a third input/output part (or port) 300*b* that allows hot water not to pass through the second regenerator 30 but to be introduced into the bypass valve 300 through the bypass flow path 301 when the auxiliary absorbing liquid does not flow into the auxiliary absorber-auxiliary heat exchanger connection line 131 (see FIG. 3).

The flow of hot water when the bypass valve 300 is operated is now described. In a state in which the bypass valve 300 is "off" (e.g., in a state in which hot water tube 37 is not bypassed), the third input/output part 300*b* is closed and the first and second input/output parts 300*a* and 300*c* are opened. In this setting, hot water E flowing through the auxiliary regenerator-second regenerator connection line 153 passes through the hot water tube 37 of the second regenerator 30 and then is discharged to the hot water outlet line 154 through the first and second input/output parts 300*a* and 300*c*. In this case, the hot water E may be heat-exchanged with the absorbing liquid C injected from the second absorbing liquid injector 36 while the hot water is being discharged to the hot water outlet line 154.

On the contrary, when the bypass valve 300 is "on" (i.e., in a state in which the hot water tube 37 is bypassed), the first input/output part 300*a* is closed and the third and second input/output parts 300*b* and 300*c* are opened. In this configuration, the hot water flowing through the auxiliary regenerator-second regenerator connection line 153 does not pass through the hot water tube 37 of the second regenerator 30 through the bypass flow path 301 but, instead, is discharged to the hot water outlet line 154 through the third and second input/output parts 300*b* and 300*c*. In this case, the hot water does not pass through the hot water tube 37 of the second regenerator 30 in the process in which the hot water is discharged to the hot water outlet line 154, and hence no heat exchange occurs between absorbing liquid injected by second absorbing liquid injector 36 and the hot water tube 37.

Meanwhile, a first cycle may be performed in the absorption refrigeration machine depicted in FIG. 1. In the first cycle, an absorbing liquid C sequentially passes through the absorber 10, the first flow path 81 of the low-temperature heat exchanger 80, the third flow path 71 of the high-temperature heat exchanger 70, the first regenerator 20, the fourth flow path 72 of the high-temperature heat exchanger 70, the second regenerator 20, and the second flow path 82 of the low-temperature heat exchanger 80, and then is introduced into the absorber 10.

Also, a second cycle may be performed in the absorption refrigeration machine depicted in FIG. 1. In the second cycle, an auxiliary absorbing liquid D sequentially passes through the auxiliary absorber 50, the fifth flow path 91 of the auxiliary heat exchanger 90, the auxiliary regenerator 60, and the sixth flow path 92 of the auxiliary heat exchanger 90, and then is introduced into the auxiliary absorber 50.

In addition, a refrigerant A evaporated in the evaporator 1 is mixed with the absorbing liquid C in the absorber 10, to pass through, together with the absorbing liquid C, the first flow path 81 of the low-temperature heat exchanger 80 and the third flow path 71 of the high-temperature heat exchanger 70 and then flow into the first regenerator 20. In this case, the refrigerant A may be partially separated from the absorbing liquid C through heat exchange in the first regenerator 20. The refrigerant A separated from the absorbing liquid C in the first regenerator 20 may flow into the condenser 40 to be condensed, and then be introduced into the flash tank 200, as described below.

Meanwhile, the other refrigerant not separated from the absorbing liquid C in the first regenerator 20 may be evaporated in the second regenerator 30 to be separated from the absorbing liquid C. In this case, the refrigerant A separated from the absorbing liquid C in the second regenerator 30 may be absorbed into an auxiliary absorbing liquid D in the auxiliary absorber 50, and the refrigerant A may pass through, together with the auxiliary absorbing liquid D, the fifth flow path 91 of the auxiliary heat exchanger 90. The refrigerant A may be separated from the auxiliary absorbing liquid D in the auxiliary regenerator 60. Meanwhile, the refrigerant A separated from the absorbing liquid C in the auxiliary regenerator 60 may flow into the condenser 40 to be condensed, and then be introduced into the flash tank 200.

In the absorption refrigeration machine depicted in FIG. 1, the inside of the second shell 22 in which the condenser 40 is located may have a high pressure P1, the first shell 2 in which the evaporator 1 is located may have a low pressure P3, and the inside of the third shell 32 in which the second regenerator 30 and the auxiliary absorber 50 are located may have an intermediate pressure P2 between the high pressure P1 and the low pressure P3. That is, the magnitudes of the pressures may be determined in an order of the pressure P1 inside the second shell 22, the pressure P2 inside the third shell 32, and the pressure P3 inside the first shell 2, which is represented using the following simple expression.

P1>P2>P3

The absorption refrigeration machine may include the flash tank 200 installed in the refrigerant line 100 between the condenser 40 and the evaporator 10. The flash tank 200 may supply a liquid refrigerant into the evaporator 10, and the flash tank 200 supply a gaseous refrigerant into the auxiliary absorber 50.

The auxiliary regenerator-second regenerator connection line 153 may be defined as a first connection line, and the auxiliary absorber-auxiliary heat exchanger connection line 131 and the auxiliary heat exchanger-auxiliary regenerator connection line 132 may be defined together as a second connection line.

Hereinafter, a two-step operation of the absorption refrigeration machine according to the embodiment will be described. First, a cooling operation in a full cooling load operation state for maximizing the heat exchange efficiency of cold water will be described.

Figure 2:
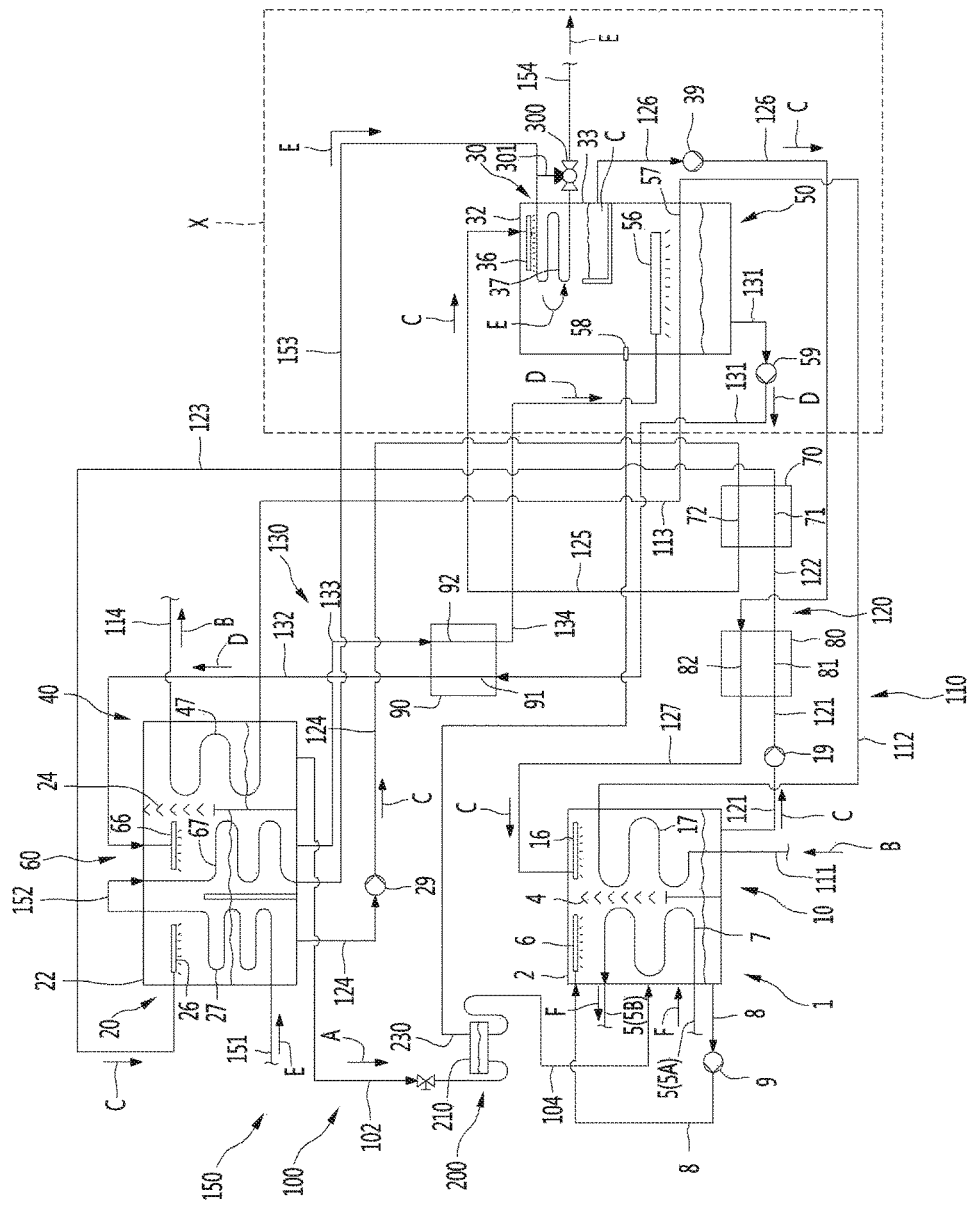
FIG. 2 is a view when the absorption refrigeration machine performs a full cooling load operation according to the embodiment.
Figure 3:
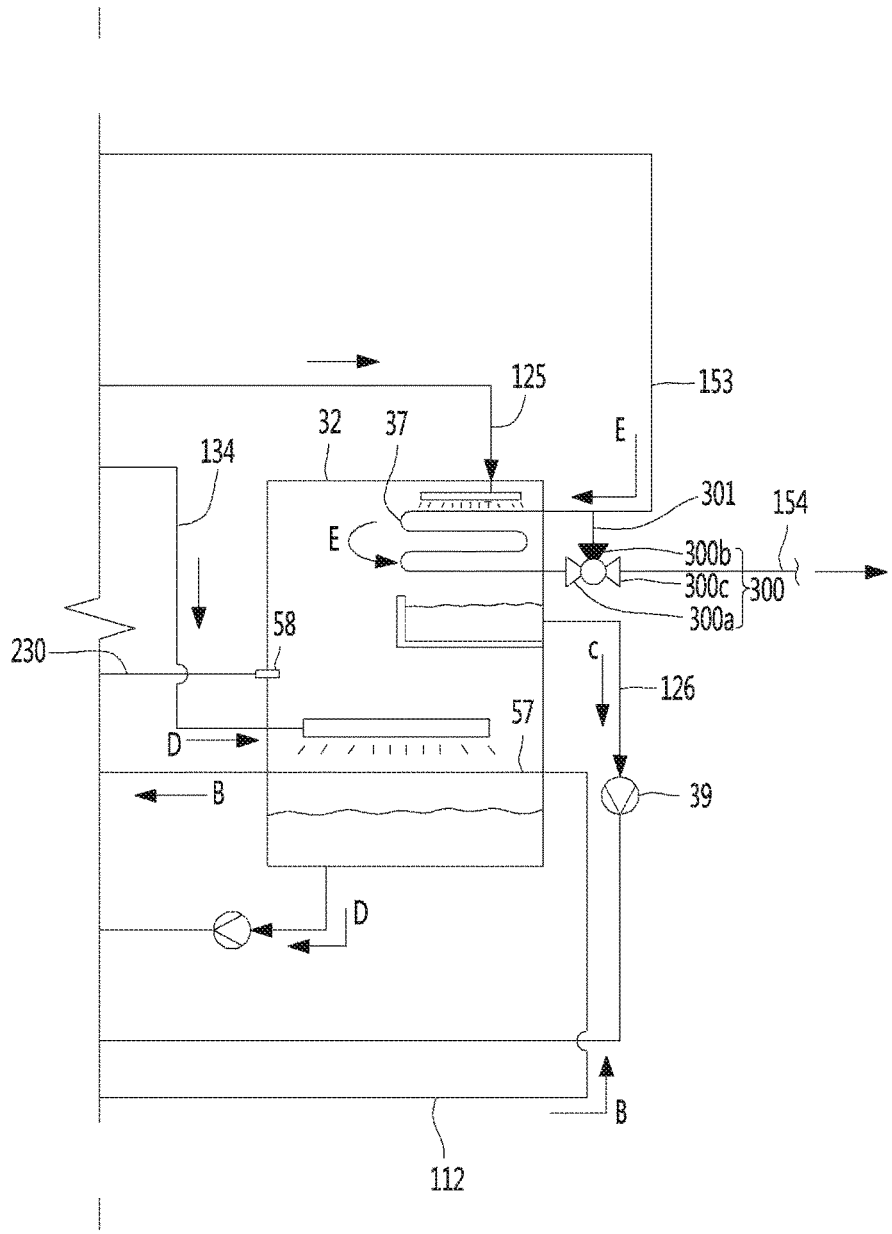
FIG. 3 is an enlarged view of portion X of FIG. 2.

FIG. 2 is a view when the absorption refrigeration machine performs a full cooling load operation, and FIG. 3 is an enlarged view of a portion X of FIG. 2. A partial cooling load operation is discussed below with respect to FIGS. 4 and 5.

Referring to FIGS. 2 and 3, a refrigerant is first introduced into the cold water injector 6 through the pumping flow path 8 by the refrigerant pump 9 and then injected from the cold water injector 6. The injected refrigerant is changed into a gaseous refrigerant by being evaporated through heat exchange with a liquid (e.g., cold water F) of the cold water tube 7.

The changed gaseous refrigerant flows into the absorption area through the first eliminator 4. The gaseous refrigerant flowing into the absorption area is absorbed into an absorbing liquid injected from the absorbing liquid injector 16 of the absorber 10. The absorbing liquid, in which concentration is lowered by absorbing the gaseous refrigerant to form a dilute solution, may be heat-exchanged with the absorbing liquid introduced from the absorbing liquid acceptor 33, while being introduced into the first flow path 81 of the low-temperature heat exchanger 80 through the absorber-low-temperature heat exchanger connection line 121 by the first pump 19. After that, the dilute solution may be injected through the absorbing liquid injector 26 of the first regenerator 20, and the temperature of the dilute solution is lowered through heat exchange with an absorbing liquid regenerated from the first regenerator 20 as the dilute solution passes through the third flow path 71 of the high-temperature heat exchanger 70. The injected dilute solution may be separated into a refrigerant and an absorbing liquid, which were previously absorbed thereinto. This separation of the dilute solution into the refrigerant and the absorbing liquid may be defined as a primary separation.

The primarily separated gaseous refrigerant may be condensed by a heart exchange with the cold water tube 47 disposed in the condenser 40. Also, the condensed refrigerant is introduced into the flash tank 200 through the flash tank entry line 102, and may be separated into a liquid refrigerant and a gaseous refrigerant in the flash tank 200. The condensed refrigerant is mostly in a liquid state (e.g., as a liquid refrigerant), but may also be partially in a gaseous state (e.g., as a gaseous refrigerant) depending on a condensation rate of the refrigerant. From the flash tank 200, the separated liquid refrigerant may be introduced into the evaporator 1 through the flash tank exit line 104, and the separated gaseous refrigerant may be introduced into the auxiliary absorption area through a first refrigerant exit tube 230 and the gaseous refrigerant introduction part 58.

Meanwhile, the second pump 29 may direct the absorbing liquid primarily separated by the first regenerator 20 to flow to the second absorbing liquid injector 36 of the second regenerator 30. For example, the absorbing liquid recovered in the second regenerator 30 may flow to the second absorbing liquid injector 36 via the first regenerator-high-temperature heat exchanger connection line 124, the fourth flow path 72 of the high-temperature heat exchanger 70, and the high-temperature heat exchanger-second regenerator connection line 125.

When the absorbing liquid from the first regenerator 20 flows to the second absorbing liquid injector 36, hot water E may flow through the auxiliary regenerator-second regenerator connection line 153, the hot water tube 37 of the second regenerator 30, and the hot water outlet line 154. As shown in FIG. 3, the hot water E flows through this path (e.g., through the hot water tube 37) the bypass valve 300 is "off" (i.e., in a state in which the hot water E does not bypass the hot water tube 37) by opening the first and second input/output parts 300a and 300c and closing the third input/output part 300b. In this configuration, the hot water does not flow into the bypass flow path 301 and around the hot water tube 37.

The primarily separated absorbing liquid (e.g., from first regenerator 20) may be injected through the second absorbing liquid injector 36 and may be secondarily separated into a gaseous refrigerant and an absorbing liquid through a heat exchange with hot water E within the hot water tube 37. The secondarily separated absorbing liquid may be contained in the absorbing liquid acceptor 33, and may flow back to the absorbing liquid injector 16 through the second regenerator-low-temperature heat exchanger connection line 126, the low-temperature heat exchanger 80, and the low-temperature heat exchanger-absorber connection line 127. Thus, the absorbing liquid contained in the absorbing liquid acceptor 33 is injected into the absorber 10.

In this manner, the first cycle may be performed in the absorption refrigeration machine. In the first cycle, the absorbing liquid C sequentially passes through the first flow path 81 of the low-temperature heat exchanger 80, the third flow path 71 of the high-temperature heat exchanger 70, the first regenerator 20, the fourth flow path 72 of the high-temperature heat exchanger 70, the second regenerator 20, and the second flow path 82 of the low-temperature heat exchanger 80 from the absorber 10, and then is re-introduced into the absorber 10.

In the full cooling load operation state, an auxiliary absorbing liquid D may be introduced into the auxiliary absorber 50 through the auxiliary absorbing liquid injector 66, and the auxiliary absorbing liquid D may be transported through the auxiliary generator-auxiliary heat exchanger connection line 133, the fifth flow path 91 of the auxiliary heat exchanger 90, and the auxiliary heat exchanger-auxiliary regenerator connection line 132 by a fourth pump 59. Furthermore, the auxiliary absorbing liquid D may be injected into the auxiliary regenerator 60 through the auxiliary absorbing liquid injector 66.

The auxiliary absorbing liquid D injected into the auxiliary regenerator 60 may be primarily separated through a heat exchange with hot water E flowing inside the hot water tube 67 of the auxiliary regenerator 60. Due to the heat exchange in the auxiliary regenerator 60, a gaseous refrigerant may be separated from the auxiliary absorbing liquid (to form a primarily separated auxiliary absorbing liquid), and the separated gaseous refrigerant may be condensed by the condenser 40 through a heat exchange with cooling water tube 47.

From the auxiliary regenerator 60, the primarily separated auxiliary absorbing liquid flows into the auxiliary absorbing liquid injector 56 through the auxiliary regenerator-auxiliary heat exchanger connection line 133, the sixth flow path 92 of the auxiliary heat exchanger 90, and the auxiliary heat exchanger-auxiliary absorber connection line 134, and the auxiliary absorbing liquid injector 56 may inject into the primarily separated auxiliary absorbing liquid into the auxiliary absorber 50. The primarily separated auxiliary absorbing liquid injected from the auxiliary absorbing liquid injector 56 may absorb the gaseous refrigerant present within the auxiliary absorber 50. As previously described, the gaseous refrigerant in the auxiliary absorber 50 may be generated in second regenerator 30 through in a separation in which absorbing liquid C (received from first regenerator 20) is injected by second absorbing liquid injector 36 for a heat exchange with the hot water tube 37. The gaseous refrigerant in the auxiliary absorber 50 may also be introduced through the gaseous refrigerant introduction part 58 from the flash tank 200.

In this way, a second cycle involving the auxiliary absorbing liquid D may be performed in the absorption refrigeration machine. As previously described, the second cycle may include the auxiliary absorbing liquid D being sequentially passed through the auxiliary absorber 50, the fifth flow path 91 of the auxiliary heat exchanger 90, the auxiliary regenerator 60, and the sixth flow path 92 of the auxiliary heat exchanger 90 to be returned to the auxiliary absorber 50.

In the absorption refrigeration machine shown in FIGS. 2 and 3, a cooling operation may include performing both the first and second cycles using both the absorbing liquid C and the auxiliary absorbing liquid D. For example, the auxiliary absorbing liquid D may be used to increase the absorption efficiency of the absorbing liquid C. Accordingly, using both the absorbing liquid C and the auxiliary absorbing liquid D may increase the heat-exchange efficiency of cold water F to enable quick cooling by the absorption refrigeration machine.

In another implementation, the absorption refrigeration machine may perform a partial cooling operation that reduces power consumption but reduces the heat-exchange efficiency of cold water F. In the following discussion of the partial cooling operation state, portions of the absorption refrigeration machine that operate differently than in the full cooling operation state will be described. Portions of the absorption refrigeration machine that operate similarly in both the full cooling operation state and the partial cooling operation state may be omitted from the discussion of the partial cooling operation.

Figure 4:
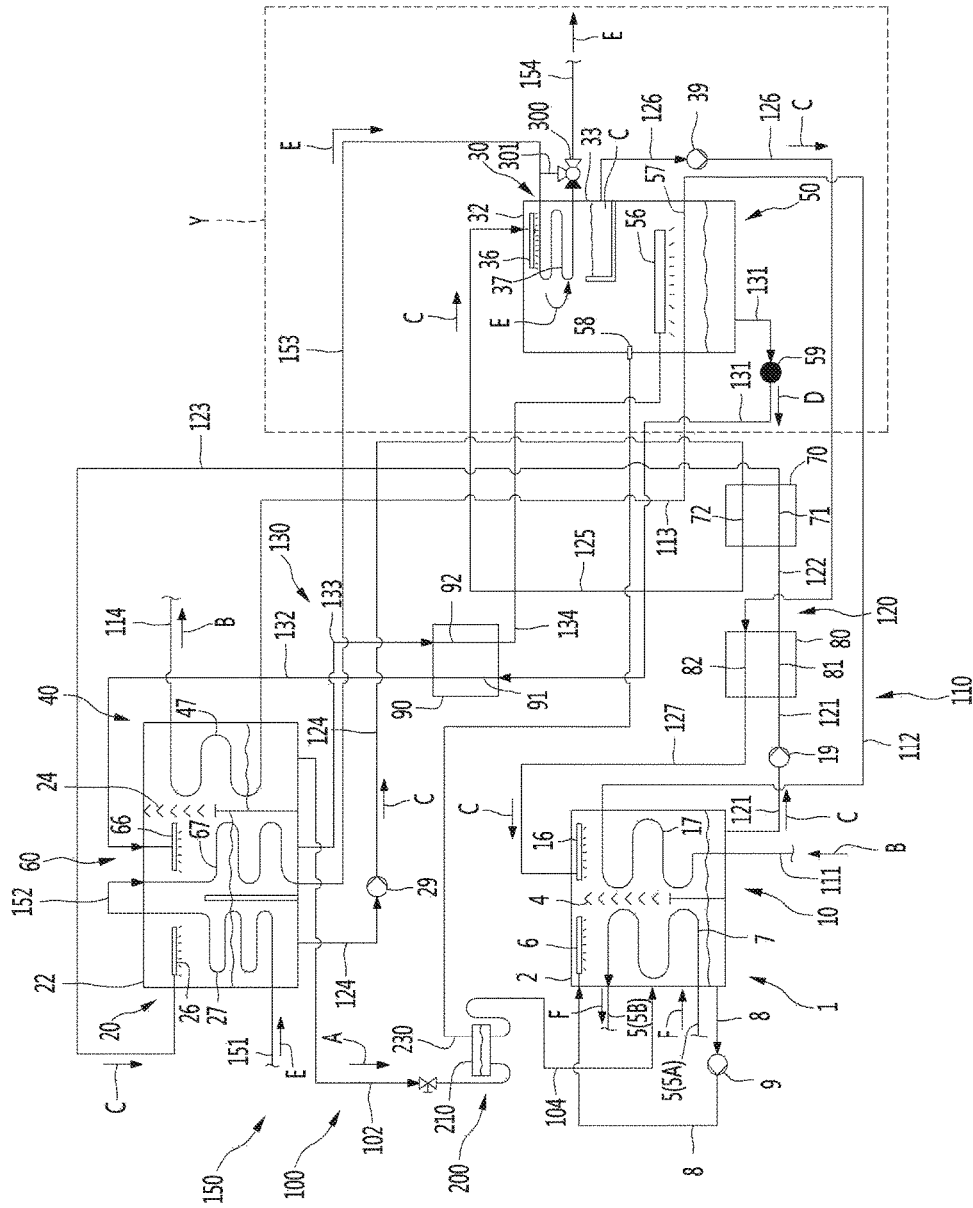
FIG. 4 is a view when the absorption refrigeration machine performs a partial cooling load operation according to the embodiment.
Figure 5:
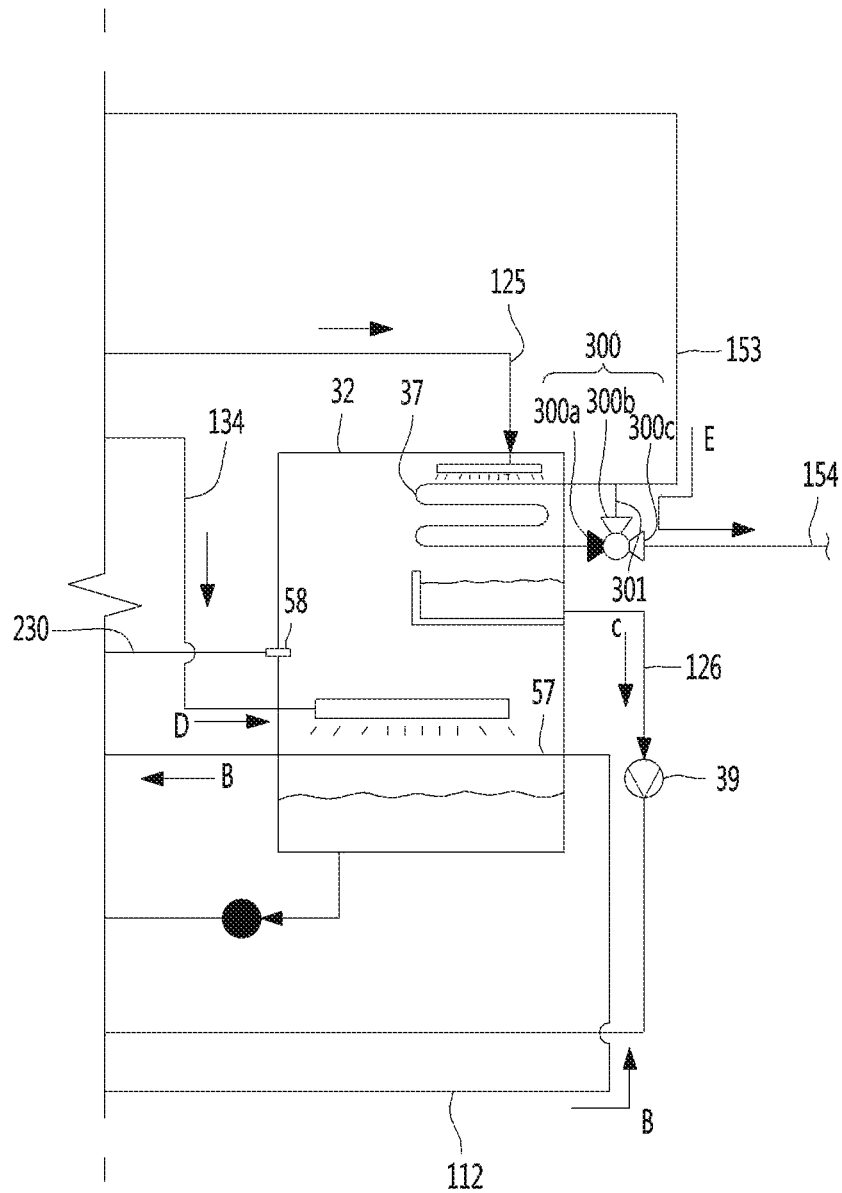
FIG. 5 is an enlarged view of portion Y of FIG. 4.
Figure 6:
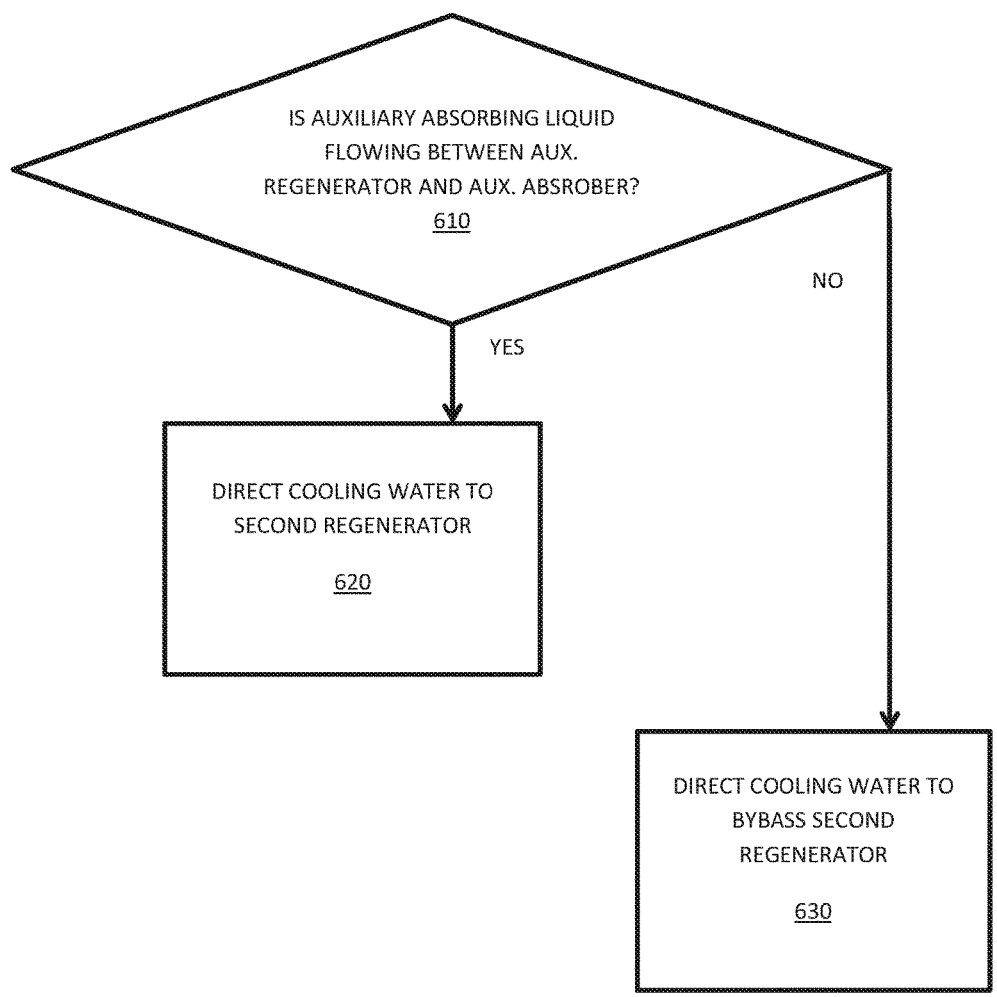
FIG. 6 is a flow chart depicting a process for controlling the operation of the absorption refrigeration machine shown in FIGS. 1-5.

FIG. 4 is a view when the absorption refrigeration machine performs a partial cooling load operation according to the embodiment, and FIG. 5 is an enlarged view of a portion Y of FIG. 4. Referring to FIGS. 4 and 5, the absorption refrigeration machine may not perform the second cycle involving the auxiliary absorbing liquid D when performing the partial cooling operation. For example, auxiliary absorbing liquid D may not flow between the auxiliary absorber 50 and the auxiliary regenerator 60, and the auxiliary absorber 50, the auxiliary heat exchanger 90, and the auxiliary regenerator 60 may not be used in the absorption refrigeration machine during the partial cooling operation.

For example, the fourth pump 59 may not operate during the partial cooling operation state such that the auxiliary absorbing liquid D does not flow through the auxiliary absorber 50, the auxiliary heat exchanger 90, and the auxiliary regenerator 60. Thus, the auxiliary absorber 50, the auxiliary heat exchanger 90, and the auxiliary regenerator 60 do not operate during the partial cooling operation. Because the regeneration of the auxiliary absorbing liquid D (e.g., by auxiliary regenerator 60) is not performed in the in the partial cooling operation state, power consumption may be reduced Furthermore, the absorption refrigeration machine may handle the absorbing liquid differently in the partial cooling operation state differently during the partial cooling operation state in comparison to the full cooling operation state. As previously described, the absorbing liquid C primarily separated in the first regenerator 20 may flow into the second absorbing liquid injector 36 of the second regenerator 30 via the first regenerator-high-temperature heat exchanger connection line 124, the fourth flow path 72 of the high-temperature heat exchanger 70, and the high-temperature heat exchanger-second regenerator connection line 125 by the second pump 29. The second absorbing liquid injector 36 may then inject the absorbing liquid C in the second regenerator 30 toward the hot water tube 37.

However, in the partial cooling operation state, the bypass valve 300 may be turned on (e.g., to bypass the hot water tube 37) such that the hot water E flowing along the auxiliary regenerator-second regenerator connection line 153 is introduced into the third input/output part 300b through the bypass flow path 301 and is discharged to the hot water outlet line 154 through the second input/output part 300c. Consequently, the hot water E does not pass through the hot water tube 37 of the second regenerator 30 but, instead, is discharged to the outside through the hot water outlet line 154.

Because the hot water E does not pass through the hot water tube 37, the absorbing liquid C primarily regenerated from the first regenerator 20 is not secondarily regenerated in the second regenerator 30 since a heat exchange does not occur when the absorbing liquid C is injected on to the hot water tube 37. Instead, the primarily regenerated absorbing liquid C is collected in the absorbing liquid acceptor 33 and is forwarded back to the absorber 10. As a result, only the first regeneration of the absorbing liquid C (e.g., by first regenerator 20) is performed in the in the partial cooling operation state. Because the second regeneration of the absorbing liquid C (e.g., by second regenerator 30) is not performed in the partial cooling operation state, power consumption may be further reduced.

Furthermore, bypassing the flow of the hot water E around the hot water tube 37 of the second regenerator 30 may produce other effects. The absorption refrigeration machine may determine whether the auxiliary absorbing liquid D is flowing between the auxiliary absorber 50 and the auxiliary regenerator 60 (block 610). As previously described, the full cooling operation state may include performing both the first cycle and the second cycle, and the second cycle includes positioning the auxiliary absorbing liquid D to partially absorb a refrigerant A in the auxiliary absorber 50 and then introducing the dilute auxiliary absorbing liquid D (i.e., carrying the absorbed refrigerant) into the auxiliary regenerator 60 to recover the absorbed refrigerant A (block 610—YES). In this way, the refrigerant A absorbed by absorbing liquid D is recovered during the full cooling operation state. However, as previously described, the auxiliary absorbing liquid D does not circulate during the partial cooling operation state (e.g., the fourth pump 59 is deactivated) such that the auxiliary absorbing liquid D remains in the auxiliary absorber 50 and does not flow to the auxiliary regenerator 60 (block 610—NO).

When the auxiliary absorbing liquid D is circulated, hot water E is directed into the second regenerator and flows through the hot water tube 37 (block 620). If absorbing liquid C from first regenerator 20 is injected to the hot water tube 37 of the second regenerator 30 while hot water E is flowing through the hot water tube 37, the refrigerant A will be separated from absorbing liquid C due to the heat exchange. The separated refrigerant may be absorbed into the auxiliary absorbing liquid D sitting in the auxiliary absorber 50. However, since the auxiliary absorbing liquid D does not circulate during the partial cooling operation state (block 610—No), the refrigerant A may accumulate in the auxiliary absorbing liquid D. Performance of the absorption refrigeration machine in the partial cooling operation state that uses absorbing liquid C may be impaired if the refrigerant is accumulated in the auxiliary absorbing liquid D.

Bypassing the flow of hot water E to hot water tube 37 (block 630) may minimize the second regeneration of refrigerant A from absorbing liquid C in second regenerator 30. Since the primarily regenerated absorbing liquid is not secondarily regenerated, the refrigerant inside the primarily regenerated absorbing liquid is not absorbed into the auxiliary absorbing liquid D of the auxiliary absorber 50. Thus, the absorption refrigeration machine may continue to operate efficiently in the partial cooling operation state without the accumulation of the refrigerant in the inactive auxiliary absorbing liquid D.

According to the absorption refrigeration machine of the present disclosure, two cycles using an absorbing liquid and an auxiliary absorbing liquid may be simultaneously performed to improve the heat-exchange efficiency of a refrigerant can be improved. Further, absorption refrigeration machine may perform only one cycle (e.g., using an absorbing liquid and not the auxiliary absorbing liquid) to conserve energy when less cooling/heating performance is desired. When only one cycle is performed, to the absorption refrigeration machine of the present disclosure may use a bypass flow path in the hot water line to prevent an absorbing liquid from being secondarily regenerated in the second regenerator. When only one cycle is performed, an absorbing liquid is not secondarily regenerated in the second regenerator, and thus a refrigerant inside the absorbing liquid is not evaporated. Accordingly, the refrigerant is not absorbed into an auxiliary absorbing liquid of the auxiliary absorber. When only one cycle is performed, loss of the refrigerant is prevented as the refrigerant is not absorbed into the auxiliary absorbing liquid, thereby improving heat-exchange efficiency.

Embodiments provide an absorption refrigeration machine, in which an auxiliary absorber and an auxiliary regenerator are additionally configured, so that a second cycle in which an absorbing liquid circulates the auxiliary absorber and the auxiliary regenerator is performed in addition to the existing first cycle in which the absorbing liquid circulates an absorber, a high-temperature regenerator, and a low-temperature regenerator, thereby improving heat-exchange efficiency. Embodiments also provide an absorption refrigeration machine, in which first and second cycles are simultaneously performed to improve heat-exchange efficiency, and only the first cycle is performed to reduce waste of power.

Embodiments also provide an absorption refrigeration machine in which, when only a first cycle is performed and a second cycle is not performed, a loss of a refrigerant does not occur due to the refrigerant being evaporated in a regenerator and the gaseous refrigerant being absorbed into an auxiliary absorbing liquid disposed in an auxiliary absorber.

In one embodiment, an absorption refrigeration machine controls whether hot water passing through a second regenerator flows, based on whether an auxiliary absorbing liquid circulating an auxiliary absorber and an auxiliary regenerator flows, so that the circulation of a refrigerant is effectively achieved. Particularly, in the absorption refrigeration machine, a bypass flow path for bypassing the flow of hot water toward the second generator is disposed between a first connection line extending to the auxiliary regenerator and the second regenerator and a hot water outlet line through which the hot water is discharged to the outside. If the flow of the auxiliary absorbing liquid flowing from the auxiliary absorber into the auxiliary regenerator is stopped, the flow of the hot water toward the second regenerator is bypassed, so that the hot water does not pass through the second regenerator.

The absorption refrigeration machine may further include a valve installed in the bypass flow path. The valve may be a three-way valve having three input/output parts. The three input/output parts may include: a first input/output part through which, when the auxiliary absorbing liquid flows through a second connection line, a refrigerant passing through the second regenerator is introduced; and a second input/output part connected to the hot water outlet line, the second input/output part allowing hot water introduced through the first input/output part to be discharged to the hot water outlet line therethrough.

The three input/output parts may further include a third input/output part through which, when the flow of the auxiliary absorbing liquid through the second connection line is stopped, the hot water flowing through the first connection line does not pass through the second regenerator but is introduced. The valve may be operated such that, when the hot water is introduced through the third input/output part, the introduced hot water is discharged through the second input/output part.

The second regenerator may be disposed at an inner upper portion of the shell, and the auxiliary absorber may be disposed at an inner lower portion of the shell. The absorption refrigeration machine may further include a pump disposed in the second connection line, to control the flow of the auxiliary absorbing liquid. If the pump is on, the auxiliary absorbing liquid may flow through the second connection line, and the hot water may flow through the first and second input/output parts of the valve. If the pump is off, the flow of the auxiliary absorbing liquid through the second connection line may be stopped, and the hot water may flow through the third and second input/output parts of the valve.

The second regenerator may include a hot water tube in which a flow path is formed such that the hot water flowing through the first connection line flows thereinside. The hot water tube may extend to the first connection line and the first input/output part of the valve.

In another embodiment, a method for controlling an absorption refrigeration machine including a first regenerator for primarily regenerating an absorbing liquid, a second regenerator for secondarily regenerating the absorbing liquid, an auxiliary absorber for absorbing an auxiliary absorbing liquid, and an auxiliary regenerator for regenerating the auxiliary absorbing liquid, the second regenerator being disposed at an inner upper portion of a shell, the auxiliary absorber being disposed at an inner lower portion of the shell, the method including: allowing hot water to selectively flow into the second regenerator, based on whether the auxiliary absorbing liquid flows in the auxiliary absorber, wherein, in the allowing of the hot water to selectively flow into the second regenerator, if the auxiliary absorbing liquid flows in the auxiliary absorber, the hot water flows into the second regenerator, and if the auxiliary absorbing liquid does not flow in the auxiliary absorber, the hot water bypasses the second regenerator.

The absorption refrigeration machine may further include: a bypass flow path through which the hot water flows by bypassing the second generator; and a valve disposed in the bypass flow path. The valve may be a three-way valve having three input/output parts. The three input/output parts may include: a first input/output part through which, when the auxiliary absorbing liquid flows in the auxiliary absorber, a refrigerant passing through the second regenerator is introduced; a second input/output part through which the hot water is discharged to the outside; and a third input/output part through which, when the flow of the auxiliary absorbing liquid in the auxiliary absorber is stopped, the hot water does not pass through the second regenerator but is introduced When the auxiliary absorbing liquid flows in the auxiliary absorber, the hot water may pass through the second regenerator and then be introduced into the second input/output part via the first input/output part. When the auxiliary absorbing liquid does not flow in the auxiliary absorber, the hot water may pass through the bypass flow path and then flow into the second input/output part via the third input/output part. The absorption refrigeration machine may further include a pump for selectively controlling whether the auxiliary absorbing liquid flows in the auxiliary absorber.

Even though all the elements of the embodiments are coupled into one or operated in the combined state, the present disclosure is not limited to such an embodiment. That is, all the elements may be selectively combined with each other without departing the scope of the invention. Furthermore, when it is described that one comprises (or includes or has) some elements, it should be understood that it may comprise (or include or have) only those elements, or it may comprise (or include or have) other elements as well as those elements if there is no specific limitation. Unless otherwise specifically defined herein, all terms comprising technical or scientific terms are to be given meanings understood by those skilled in the art. Like terms defined in dictionaries, generally used terms needs to be construed as meaning used in technical contexts and are not construed as ideal or excessively formal meanings unless otherwise clearly defined herein. For example, the terms paths, lines, tubes, cylinder, conduit, hose, duct, etc. may be used interchangeably herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An absorption refrigeration machine comprising:
a first absorber configured to cause a first absorbing liquid to absorb a refrigerant;
a first regenerator coupled to the first absorber to receive the first absorbing liquid, wherein the first regenerator is configured to cause the first absorbing liquid to release at least a portion of the absorbed refrigerant;
a second regenerator coupled to the first regenerator to receive the first absorbing liquid, wherein the second regenerator is configured to be selectively activated to cause the first absorbing liquid to release another portion of the absorbed refrigerant;
a second absorber coupled to the second regenerator, wherein when the second regenerator is activated, the second absorber is configured to cause a second absorbing liquid to absorb the refrigerant;
a third regenerator coupled to the second absorber, wherein the third regenerator is configured to receive the second absorbing liquid and cause the second absorbing liquid to release the absorbed refrigerant;
a condenser configured to capture the released refrigerant from the first regenerator and the third regenerator; and
a flash tank coupled to the condenser, the first absorber and the second absorber wherein the flash tank is configured to receive the refrigerant from the condenser and to forward the received refrigerant to at least one of the first absorber or the second absorber.

2. The absorption refrigeration machine according to claim 1, wherein the flash tank stores a first portion of the refrigerant in a liquid form and a second portion of the refrigerant in a gaseous form, and wherein the flash tank provides the refrigerant in the liquid form to the first absorber and the refrigerant in the gaseous form to the second absorber.

3. The absorption refrigeration machine according to claim 1, further comprising a tube that transports a cooling fluid between the first absorber, the second absorber, and the condenser, wherein a first heat exchange between the cooling fluid and the first absorbing liquid in the first absorber causes the first absorbing liquid to absorb the refrigerant, a second heat exchange between the cooling fluid and the second absorbing liquid in the second absorber causes the second absorbing liquid to absorb the refrigerant, and a third heat exchange between the cooling fluid and the refrigerant in the condenser converts the refrigerant from a gaseous form to a liquid form.

4. The absorption refrigeration machine according to claim 1, wherein the second regenerator includes a first tube that transports a warming fluid when the second regenerator is activated, and an injector the directs the first absorbing liquid to the first tube,
wherein when the second regenerator is activated and the first tube transports the warming fluid, a heat exchange between the first absorbing liquid and the warming fluid causes the first absorbing liquid to release the absorbed refrigerant, and
wherein the absorption refrigeration machine further comprises a second tube that bypasses the second regenerator and transports the warming fluid away from the first tube when the second regenerator is deactivated.

5. The absorption refrigeration machine according to claim 4, further comprising a valve,
wherein the valve includes a first port coupled to the first tube, a second port configured to receive the warming fluid, and a third port coupled to the second tube, wherein the first and second ports are opened and the third port is closed when the second regenerator is activated to supply the warming fluid to the first tube, and wherein the second and third ports are opened and the first port is closed when the second regenerator is deactivated to bypass the first tube and direct the warming fluid to the second tube.

6. The absorption refrigeration machine according to claim 5, wherein the absorption refrigeration machine further comprises a third tube that receives the warming fluid from the second port and forwards the warming fluid to the first and third regenerators for heat exchange with the first absorbing liquid and the second absorbing liquid to cause the absorbed refrigerant to be released from the first absorbing liquid and the second absorbing liquid.

7. The absorption refrigeration machine according to claim 1, wherein the second regenerator is provided in an upper portion of a cavity included in the absorption refrigeration machine, and the second absorber is provided in a lower portion of the cavity.

8. The absorption refrigeration machine according to claim 7, further comprising a tray provided in the cavity and between the second regenerator and the second absorber, wherein the tray is configured to capture the first absorbing liquid from the second regenerator.

9. The absorption refrigeration machine according to claim 8, further comprising:
a tube connecting the first absorber and the tray, and
a pump provided in the tube to move the first absorbing liquid from the tray to the first absorber via the tube.

10. The absorption refrigeration machine according to claim 1, further comprising:
a tube connecting the second absorber and the third regenerator, and
a pump disposed in the tube to selectively move the second absorbing liquid between the second absorber and the third regenerator via the tube, wherein the pump is activated when the second regenerator is activated.

11. A method for controlling an absorption refrigeration machine, the method comprising:
removing, by a first regenerator included in the absorption refrigeration machine, a first portion of a dissolved refrigerant from a first absorbing liquid, wherein the refrigerant is absorbed by the first absorbing liquid in a first absorber included in the absorption refrigeration machine, and wherein a second regenerator included in the absorption refrigeration machine selectively removes a second portion of the dissolved refrigerant from the first absorbing liquid;
determining whether a second absorbing liquid is flowing between a second absorber and a third regenerator included in the absorption refrigeration machine; and
controlling a flow of a warming fluid into the second regenerator based on whether the second absorbing liquid is flowing between the second absorber and the third regenerator,
wherein the second regenerator includes a first tube that transports the warming fluid when the warming fluid flows into the second regenerator,
wherein the absorption refrigeration machine further comprises a second tube that bypasses the second regenerator and transports the warming fluid away from the first tube when the warming fluid does not flow into the second regenerator, and
wherein controlling the flow of the warming fluid into the second regenerator includes:
directing the warming fluid to the first tube and into the second regenerator when the second absorbing liquid flows between the second absorber and the third regenerator, and
directing the warming fluid to the second tube and away from the second regenerator when the second absorbing liquid does not flow between the second absorber and the third regenerator.

12. The method according to claim 11, wherein the absorption refrigeration machine further comprises a valve provided in the first and second tubes, and wherein controlling the flow of the warming fluid includes configuring the valve to direct the warming fluid to one of the first tube or the second tube based on whether the second absorbing liquid is flowing between the second absorber and the third regenerator.

13. The method according to claim 12, wherein the valve includes a first port coupled to the first tube, a second port configured to direct the warming fluid from the valve via a third tube, and a third port coupled to the second tube, wherein controlling the flow of the warming fluid includes:
opening the first and second ports and closing the third port when the second absorbing liquid is flowing between the second absorber and the third regenerator, and opening the second and third ports and closing the first port when the second absorbing liquid is not flowing between the second absorber and the third regenerator.

14. The method according to claim 11, wherein a heat exchange occurs between the first absorbing liquid and the warming fluid when the warming fluid is directed into the first tube to cause the first absorbing liquid to release the refrigerant, and wherein the heat exchange does not occur between the first absorbing liquid and the warming fluid when the warming fluid is directed into the second tube.

15. The method according to claim 14, wherein, when the second absorbing liquid flows is flowing between the second absorber and the third regenerator, the second absorbing liquid absorbs the refrigerant released by the first absorbing liquid.

16. The method according to claim 11, wherein the absorption refrigeration machine further comprises a pump for selectively moving the second absorbing liquid between the second absorber and the third regenerator, and wherein determining whether the second absorbing liquid is flowing between the second absorber and the third regenerator includes determining whether the pump is activated.

17. An absorption refrigeration machine comprising:
a regenerator configured to receive a first absorbing liquid, wherein the regenerator is configured to be selectively activated to cause the first absorbing liquid to release a refrigerant;
a tray configured to capture the first absorbing liquid from the regenerator;
an absorber coupled to the regenerator and storing a second absorbing liquid; and
a valve to direct a warming fluid to one of the regenerator or a tube that bypasses the regenerator,
wherein when the regenerator is activated to cause the first absorbing liquid to release the refrigerant, the absorber is configured to cause the second absorbing liquid to absorb the refrigerant, wherein, when the valve directs the warming fluid to the regenerator, a heat exchange between the first absorbing liquid and the warming fluid causes the first absorbing liquid to release the refrigerant, and wherein the heat exchange does not occur when the valve directs the warming fluid to the tube that bypasses the regenerator.

* * * * *